United States Patent

Ratte

[11] Patent Number: 6,082,937
[45] Date of Patent: Jul. 4, 2000

[54] METHOD OF REPROCESSING BATTERY TERMINALS

[75] Inventor: Robert W. Ratte, North Oaks, Minn.

[73] Assignee: Water Gremlin Company, White Bear Late, Minn.

[21] Appl. No.: 09/170,250

[22] Filed: Oct. 13, 1998

[51] Int. Cl.[7] ....................................................... B23C 3/04
[52] U.S. Cl. ........................... 409/132; 409/159; 409/172
[58] Field of Search ................................... 409/132, 140, 409/138, 159, 172, 228, 229

[56] References Cited

U.S. PATENT DOCUMENTS

| | | | |
|---|---|---|---|
| 4,610,581 | 9/1986 | Heinlein | 409/132 |
| 4,776,197 | 10/1988 | Scott | 72/353 |
| 4,835,711 | 5/1989 | Hutchins et al. | 364/513 |
| 4,998,206 | 3/1991 | Jones et al. | 364/468 |

Primary Examiner—Stephen F. Gerrity
Assistant Examiner—Adrian M. Wilson
Attorney, Agent, or Firm—Jacobson & Johnson

[57] ABSTRACT

A method and apparatus for converting a finished battery terminal suitable for a first application into a battery terminal suitable for a second application in one operation that does not require reforming of the finished battery terminals by picking the finished battery terminal suitable for a first application from a delivery rack and delivering the finished battery terminal suitable for a first application to a depth stand that includes a cutter which removes a portion of the finished battery terminal suitable for a first application while the depth stand limits the portion removed to thereby form a finished battery terminal suitable for a second application from the battery terminal suitable for a first application and then deliver the finished battery terminal suitable for a second application for shipment to a customer without requirement of further processing.

10 Claims, 2 Drawing Sheets

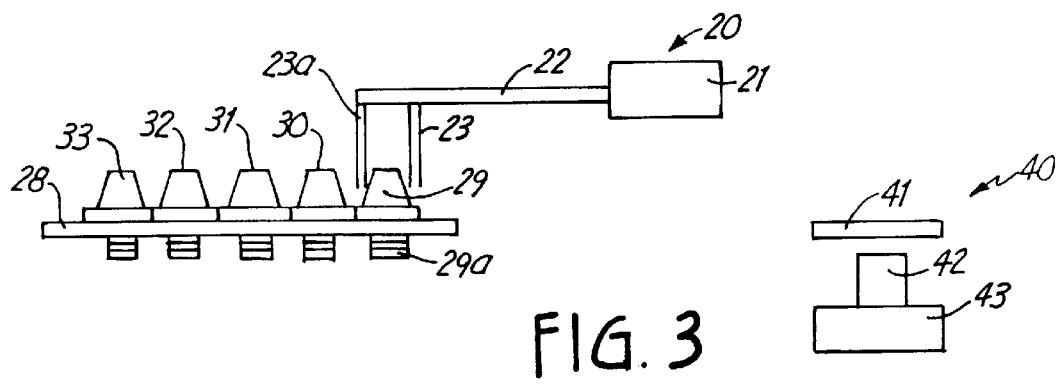
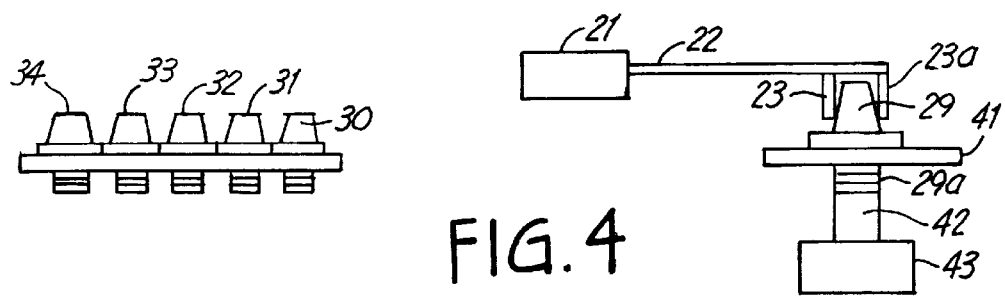
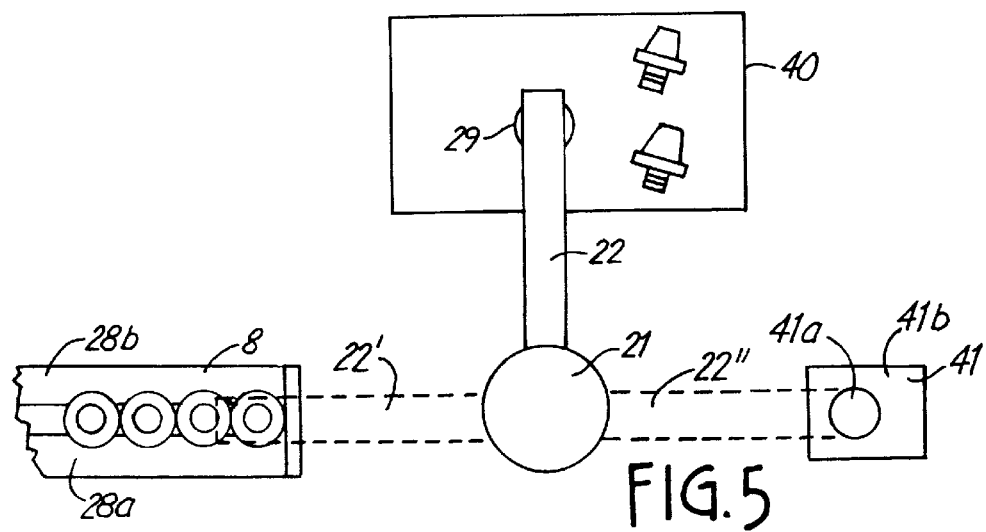

METHOD OF REPROCESSING BATTERY TERMINALS

FIELD OF THE INVENTION

This invention relates generally to battery terminal equipment and more specifically to battery terminal equipment for converting finished battery terminals used primarily for one application into a finished battery terminal used primarily for a second, different application without having to reform the battery terminal.

BACKGROUND OF THE INVENTION

The concept of making finished battery terminals through a cold forming process is described in Ratte et al. U.S. Pat. No. 5,349,840 and U.S. Pat. No. 5,373,720. In the Ratte et al. patent, a set of dies and a punch coact to squeeze a lead slug into the shape of a finished battery terminal. In another process shown in U.S. Pat. No. 4,776,197, a set of dies squeezes a lead slug into the shape of an unfinished battery terminal where both ends of the battery terminal are cut off to form finished battery terminals. In still another process, a set of dies and punch are used to squeeze a lead slug into a battery terminal that requires finishing of one end of the battery terminal.

One of the problems associated with the production of battery terminals is that not all batteries require the same length of terminal. Consequently, some battery terminals must be made shorter and some battery terminals must be made longer. The process of forming a finished battery terminal to one size and forming a battery terminal to a different size requires removing and inserting new dies which is a time consuming process, that slows down the production capabilities of the machinery as each time the new dies are inserted, the machines need to be adjusted until the proper size and the proper conditions of the cold formed metal is obtained. With the present invention, the battery terminals are made to the length of the longest needed battery terminals and then a portion of the battery terminals is removed to provide finished battery terminals of shorter length without having to disrupt the automated production process of the battery terminals. Thus, more battery terminals can be manufactured from a single machine, as no down time is required to change dies.

This allows for the manufacture of multiple types of battery terminals from a single die casting machine.

The present invention provides a process and apparatus for converting a finished battery terminal suitable for a first application into a battery terminal suitable for a second application in one operation that does not require reforming of the battery terminal, and does not induce stress, thereby eliminating down time as well as time and costs to set up the die casting machines.

DESCRIPTION OF THE PRIOR ART

U.S. Pat. Nos. 5,458,032 and 5,655,400 show a method of using a progressive die to form a finished terminal that requires a die to punch out the end of the battery terminal.

U.S. U.S. Pat. No. 4,776,197 shows a process of making an unfinished battery terminal wherein both ends of the terminals are cutaway to form a finished battery terminal.

U.S. Pat. Nos. 5,349,840 and 5,373,720 show a method of making a finished battery terminal in one operation.

SUMMARY OF THE INVENTION

Briefly, the present invention comprises a method and apparatus for converting a finished battery terminal suitable for a first application into a battery terminal suitable for a second application in one operation that does not require reforming of the battery terminals. The method includes picking the battery terminal suitable for a first application from a delivery rack and transporting the battery terminal suitable for a first application to a depth stand that includes a cutter which removes a portion of the battery terminal suitable for a first application while the depth stand limits the portion removed to thereby form the battery terminal suitable for a second application from the battery terminal suitable for a first application, and then deliver the battery terminal suitable for a second application to a condition for delivery to a customer.

BRIEF DESCRIPTION OF THE DRAWINGS

FIG. 3 shows a partial schematic view of a system for converting a finished battery terminal suitable for a first application to a finished battery terminal suitable for a second application with a pickup arm in the position of removing one of the finished battery terminals suitable for a first application from a battery terminal delivery rack;

FIG. 4 shows the system of FIG. 3 with a pickup arm in the position of holding the finished battery terminal while a portion of the finished battery terminal is being removed to convert the finished battery terminal suitable for a first condition to a finished battery terminal suitable for a second condition; and FIG. 5 shows the system of FIG. 3 with a pickup arm in the position of delivering a finished battery terminal that has been covered to a finished battery terminal suitable for a second application.

DESCRIPTION OF THE PREFERRED EMBODIMENT

Figure 1:
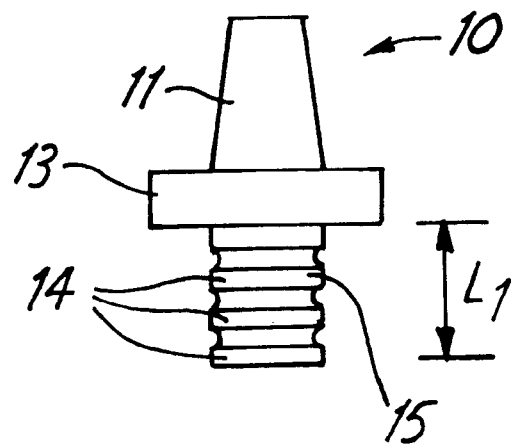
FIG. 1 shows a side view of a finished battery terminal suitable for a first application.

FIG. 1 shows a side view of a finished battery terminal 10 suitable for a first application with the finished battery terminal including a flange 13 with an upper hollow cylindrical extension 11 on one end and a lower hollow cylindrical extension 15 on the opposite end with a set of three acid rings 14 located thereon. The length of the lower extension is indicated by $L_1$. By finished battery terminal it is understood that the battery terminal does not require further finishing or handling and is in a condition to be shipped to a customer.

Figure 2:
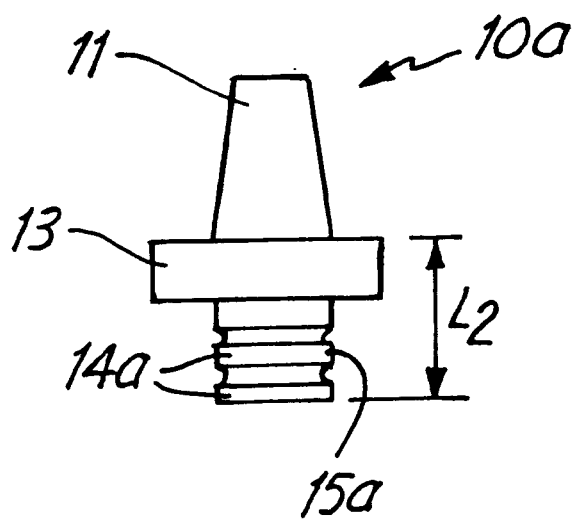
FIG. 2 shows a side view of the finished battery terminal of FIG. 1 having been converted to a finished battery terminal suitable for a second application.

FIG. 2 shows a side view of the finished battery terminal 10 of FIG. 1 having been converted to a finished battery terminal 10a suitable for a second application, with the lower cylindrical extension 15a having been shortened so that only two acid rings 14a remain thereon. The length of the lower extension is indicated by $L_2$. In the embodiment shown in FIG. 2, the battery terminal 10a has been further handled and worked without disturbing the portions of the battery terminal that have already been placed in a finished condition. That is, the battery terminal 10 retains its finished condition except for those portions which have been refinished.

FIG. 3 shows a partial schematic view of a system 20 for converting a finished battery terminal suitable for a first application to a finished battery terminal suitable for a second application. Systems 20 includes a pick and place unit 21 having a pickup arm 22 in the position of removing a finished battery terminal 29, which is suitable for a first application from a battery terminal delivery rack 28. Pick and place unit 21 is preferably robotically controlled (not shown) so that the battery terminals can be continuously and automatically delivered from one station to another station. Pick and place units 21 are commercially available and will not be described herein. Finished battery terminal 29 is shown in a first position. In this condition, a set of grippers 23 and 23a can be closed about the end extension of terminal 29 to frictionally grasp the terminal so that pick and place mechanism can lift terminal 29 vertically out of delivery rack 28. Once a terminal is removed, the remaining terminals 30, 31, 32, and 33 slide downward to the first position where they can be grasped and removed during a later cycle of the system.

The station for refinishing a portion of the battery terminal is identified by reference numeral 40 and includes a depth stand 41, an end mill 42 and a motor 43 for rotating the end mill. End mill 42 has a diameter larger than the extensions it contacts so that the end mill cuts off the extensions through removal of small portions of the extensions thereby preventing the introduction of stress into the battery terminal through such actions as punching or sawing.

FIG. 4 shows the system of FIG. 3 with a pickup arm 22 in the position of holding a battery terminal 29 in a depth stand 41 so that a lower portion of extension 29a can be removed by rotating end mill 42. The step of holding the finished battery terminal 29 while a portion of the finished battery terminal is being removed allows one to convert the finished battery terminal suitable for a first condition to a finished battery terminal suitable for a second condition in one step without having to refinish the entire battery terminal.

FIG. 5 shows a top view of the system of FIG. 3 with a pickup arm 22 in the position of delivering a finished battery terminal 29 that has been converted to a finished battery terminal suitable for a second application to a hopper 40. FIG. 5 also shows that delivery rack 28 includes a first rail 28a and a second rail 28b which support the battery terminals thereon. The battery terminals can be advance along the rails through numerous means and methods such as vibration or gravity. The depth stand 41 is shown having an opening 41a therein for receiving the lower extension of a battery terminal with the top surface 41b forming a stop to limit the penetration of a battery terminal therein and consequently limit the amount of material removed from the end of the battery terminal as the end of the end mill remains fixed while the battery terminal is brought into contact therewith. The various operative positions of the pick up arm are designated in dotted lines. That is, 22' indicates the first position for picking up a battery terminal, 22" indicted the position for holding the battery terminal in a position where a portion of the battery terminal can be refinished, and 22 indicates the drop off position where the battery terminal can be dropped into a hopper 40.

I claim:

1. A method of converting a finished battery terminal suitable for a first application to a finished battery terminal suitable for another application without having to reform the battery terminal comprising the steps of:

placing a plurality of finished battery terminals suitable for a first application on a delivery rack in order to deliver finished battery terminals suitable for a first application to a first position;

picking the finished battery terminals suitable for a first application from the first position;

transporting the finished battery terminal suitable for a first application to a depth stand having a cutter located therebeneath;

lowering the finished battery terminal suitable for a first application into the depth stand while the cutter removes a lower portion of the finished battery terminal to provide a finished battery terminal suitable for a second application;

removing the finished battery terminal suitable for a second application from the depth stand; and delivering the finished battery terminal suitable for a second application to a hopper for delivery to a customer.

2. The method of claim 1 including the step of lifting the finished battery terminal suitable for a first application by grasping a top portion of the finished battery terminal suitable for a first application.

3. The method of claim 2 including the step of vibrating the delivery rack to deliver the finished battery terminal suitable for a first application to the first position, holding the finished battery terminal suitable for a first application which a lower portion is removed therefrom and transferring the finished battery terminal while suitable for a first application to the depth stand and subsequently to the hopper.

4. The method of claim 1 including the step of holding the finished battery terminal suitable for a first application while a lower portion is removed therefrom.

5. The method of claim 1 including vibrating the delivery rack to deliver the finished battery terminal suitable for a first application to the first position.

6. The method of claim 1 including the use of a single pickup arm for transferring the finished battery terminal suitable for a first application to the depth stand and subsequently to the hopper.

7. An apparatus for converting a finished battery terminal suitable for a first application to a finished battery terminal suitable for another application without having to reform the battery terminal comprising;

a delivery rack for delivering a plurality of battery terminals to a first position;

a depth stand including a cutter;

a hopper;

a pick and place unit for picking an individual battery terminal from the delivery rack and transferring the individual battery terminal to the depth stand for sufficient time to enable the cutter to remove a portion of the finished battery terminal and then transferring the individual finished battery terminal to a hopper for shipment.

8. The apparatus of claim 7 wherein the depth stand includes a plate having a top surface for engaging a flange to thereby limit the penetration of the battery terminal.

9. The apparatus of claim 8 wherein the cutter comprises an end mill.

10. The apparatus of claim 9 wherein the pick and place unit is robotically controlled.

* * * * *